United States Patent
Leconte et al.

(10) Patent No.: US 9,825,286 B2
(45) Date of Patent: Nov. 21, 2017

(54) METHOD FOR PRODUCING AN ELECTRODE FOR A LITHIUM ACCUMULATOR AND ASSOCIATED ELECTRODE

(71) Applicant: COMMISSARIAT A L'ENERGIE ATOMIQUE ET AUX ENERGIES ALTERNATIVES, Paris (FR)

(72) Inventors: Yann Leconte, Saint-Remy les Chevreuse (FR); Nathalie Herlin-Boime, Orsay (FR); Axelle Quinsac, Montigny-le-Bretonneux (FR); Willy Porcher, Grenoble (FR); Marc Brestaz, Compiegne (FR); Séverine Jouanneau Si Larbi, Sillans (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 26 days.

(21) Appl. No.: 14/646,756

(22) PCT Filed: Nov. 25, 2013

(86) PCT No.: PCT/EP2013/074561
§ 371 (c)(1),
(2) Date: May 22, 2015

(87) PCT Pub. No.: WO2014/080006
PCT Pub. Date: May 30, 2014

(65) Prior Publication Data
US 2015/0303462 A1 Oct. 22, 2015

(30) Foreign Application Priority Data
Nov. 26, 2012 (FR) ...................................... 12 61250

(51) Int. Cl.
H01M 4/36 (2006.01)
H01M 4/04 (2006.01)
(Continued)

(52) U.S. Cl.
CPC ......... H01M 4/366 (2013.01); H01M 4/0404 (2013.01); H01M 4/0435 (2013.01);
(Continued)

(58) Field of Classification Search
CPC .. H01M 4/366; H01M 4/0404; H01M 4/0435; H01M 4/134; H01M 4/1395;
(Continued)

(56) References Cited

U.S. PATENT DOCUMENTS 6,254,928 B1 * 7/2001 Doan ...................... B01J 2/003
204/157.41
2003/0157867 A1 8/2003 Doan
(Continued)

FOREIGN PATENT DOCUMENTS

FR 2 885 734 A1 11/2006
FR 2 965 107 A1 3/2012
JP 2008277196 A * 11/2008

OTHER PUBLICATIONS

Sourice et al. "One-Step Synthesis of Si@C Nanoparticle by Laser Pyrolysis: High-Capacity Anode Materials for Lithium-Ion Batteries", ACS Appl. Mater. Interfaces, Mar. 11, 2015, 7, pp. 6637-6644.*
(Continued)

Primary Examiner — Gregg Cantelmo
(74) Attorney, Agent, or Firm — Alston & Bird LLP (57) ABSTRACT

A method for producing an electrode comprising a core-shell nanocomposite material of which the core is made from silicon and the shell from carbon is provided. The method includes A) synthesising the nanocomposite material by
(Continued)

pyrolysing a silicon core to form a core and then pyrolysing a a carbon shell precursor to form a carbon shell around the core, wherein the quantities of silicon and carbon precursor are injected in a proportion such that the mass percentage of carbon in the nanocomposite material is greater than or equal to 45%; B) dispersing the nanocomposite material synthesised in step A) in a solvent to form an ink; C) applying this ink to a support intended to form an electricity collector; D) eliminating the solvent from the ink applied to the support in step C) to obtain the electrode; E) pressing or calendaring the electrode.

10 Claims, 4 Drawing Sheets

(51) Int. Cl.
| | |
|---|---|
| *H01M 4/134* | (2010.01) |
| *H01M 4/1395* | (2010.01) |
| *H01M 4/38* | (2006.01) |
| *H01M 4/583* | (2010.01) |
| *H01M 4/62* | (2006.01) |
| *H01M 10/052* | (2010.01) |

(52) U.S. Cl.
CPC ......... *H01M 4/134* (2013.01); *H01M 4/1395* (2013.01); *H01M 4/386* (2013.01); *H01M 4/583* (2013.01); *H01M 4/622* (2013.01); *H01M 4/625* (2013.01); *H01M 10/052* (2013.01)

(58) Field of Classification Search
CPC ...... H01M 4/386; H01M 4/583; H01M 4/622; H01M 4/625; H01M 10/052
See application file for complete search history.

(56) References Cited

U.S. PATENT DOCUMENTS

| | | | |
|---|---|---|---|
| 2005/0031780 A1 | 2/2005 | Matsui | |
| 2006/0275668 A1* | 12/2006 | Peres | B82Y 30/00 429/231.8 |
| 2007/0009801 A1* | 1/2007 | Inagaki | C01G 23/005 429/231.95 |
| 2009/0056628 A1* | 3/2009 | Kortshagen | B82Y 30/00 118/718 |
| 2010/0147675 A1* | 6/2010 | Herlin-Boime | B01J 19/121 204/157.41 |
| 2010/0297502 A1 | 11/2010 | Zhu et al. | |
| 2013/0157105 A1 | 6/2013 | Picard et al. | |

OTHER PUBLICATIONS

International Search Report and Written Opinion for Application No. PCT/EP2013/074561 dated Jan. 2, 2014.

Dimov et al., *Mixed Silicon-Graphite Composites as Anode Material for Lithium-Ion Batteries: Influence of Preparation Conditions on the Properties of the Material*, Journal of Power Sources, 136, pp. 108-114, 2044.

* cited by examiner

METHOD FOR PRODUCING AN ELECTRODE FOR A LITHIUM ACCUMULATOR AND ASSOCIATED ELECTRODE

FIELD

The present invention relates to a method for producing an electrode comprising a core-shell nanocomposite material as the active material, a nanocomposite material of which the core is made of silicon and the shell of carbon.

The invention also relates to an electrode obtained by this method.

This electrode may notably be used for a lithium accumulator.

Nanoparticles are understood to mean particles of which the dimensions are less than one micron.

BACKGROUND

Figure 1:
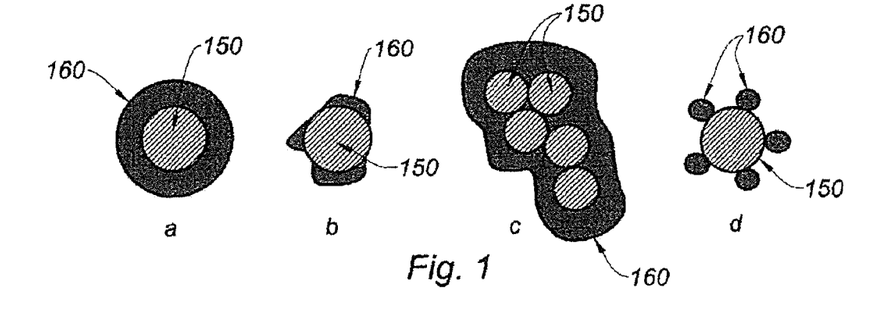

Core-shell nanoparticles are formed of a core coated with a shell. This coating may be full or partial as shown in the various diagrams a, b, c and d in FIG. 1. In these diagrams, the core is referenced 150 and the shell 160.

For example, FR 2 885 734 (D1) provides a method for producing a Si—C (core-shell) nanocomposite material.

This process includes the following steps: a') providing a silicon powder obtained by the technique of plasma-enhanced (PECVD) or $CO_2$-laser-assisted chemical vapor deposition, the size of the silicon nanoparticles being less than 100 nm; b') mixing the silicon powder with a carbon polymer; c') pyrolysing the mixture.

The Si—C nanocomposite material thus formed is then used to form an anode of a lithium accumulator.

In this method, the performance of step b') of mixing the silicon powder with the carbon polymer (serving as a precursor of the carbon for subsequent pyrolysis) is crucial.

Indeed, it is known from the prior art that the carbon shell has several functions within the Si—C nanocomposite material. It serves to accommodate variations in volume of the silicon during its lithiation (formation of a lithium/silicon alloy the volume of which is greater than that of the silicon). It also serves to limit the aggregation of nanoparticles during the cycling (charge/discharge) of the electrode. It also provides an electronic percolation network within the electrode. Finally, the carbon mass fraction within the nanocomposite material can be used to reduce the instability of the electrode/electrolyte interface.

In addition, it sometimes happens during step b') that an undesirable compound forms, such as silicon carbide (SiC).

As a result, when this nanocomposite material is used as an anode for a lithium accumulator, the performance of this anode is not optimized.

Other methods of production of a Si—C nanocomposite material exist, in particular for producing an anode for a lithium accumulator.

Thus, it has been proposed to crush together silicon and carbon (e.g. in the form of graphite) before pyrolysing the previously crushed mixture. This is, for example, the case in the article by Dimov et al., '*Mixed silicon-graphite composites as anode material for lithium-ion batteries: Influence of preparation conditions on the properties of the material*', Journal of Power Sources, 136 (pp. 108-114), 2044 (D2).

For mixing the silicon and carbon, this type of method requires a lot of energy. However, owing to the required energy level, silicon carbide (SiC) and/or an agglomeration of Si—C nanoparticles are often formed, what is, in all cases, detrimental to the intended application.

The methods provided in items D1 and D2 therefore present limits which have consequences for the electrochemical properties of the finally produced electrode.

SUMMARY

One objective of the present invention is thus to provide a method for producing an electrode comprising a core-shell nanocomposite material as the active material, a nanocomposite material of which the core is made of silicon and the shell of carbon for improving the performance of known electrodes.

In particular, the improvement in performance entails an improvement in the coulombic efficiency of the electrode and/or better stability of this electrode.

To achieve this objective, the invention provides a method for producing an electrode comprising a core-shell nanocomposite material of which the core is made of silicon and the shell of carbon, characterized in that it includes the following steps:

A) synthesizing the nanocomposite material in accordance with the following substeps:
  a) injecting a silicon core precursor into a first chamber of a reactor;
  b) pyrolysing the silicon core precursor in order to form the nanoparticle core;
  c) transporting the nanoparticle core thus formed in step (b) into a second chamber of the reactor communicating with the first chamber;
  d) injecting a carbon shell precursor into the second chamber of the reactor;
  e) pyrolysing the shell precursor in order to form the nanoparticle shell and ensure the homogeneous deposition of this shell around the core;
  f) collecting the nanoparticles thus formed so as to obtain the nanocomposite material;
in which the quantities of silicon and carbon precursor are injected in a proportion such that the carbon mass fraction in the nanocomposite material is greater than or equal to 45%;
B) dispersing the nanocomposite material synthesized in step A) in a solvent to form an ink;
C) applying this ink onto a support intended to form an electricity collector;
D) eliminating the solvent from the ink applied onto the support in step C) to obtain the electrode;
E) pressing or calendering the electrode.

The method according to the invention may also include the following features, taken alone or in combination:
  step a) is performed using an inert gas such as argon;
  step b) and/or step e) is/are performed by laser pyrolysis;
  the quantities of silicon and carbon precursor are injected in a proportion such that the carbon mass fraction in the nanocomposite material is between 45% and 90%, preferably between 60% and 80%;
  step B) consists in dispersing an electrically conductive agent in the solvent, in addition to the nanocomposite material, to form the ink;
  the conductive agent is of the divided carbon type, e.g. carbon black, carbon fibers or carbon nanotubes, or a mixture thereof;
  step B) consists in dispersing a polymer binder in the solvent, in addition to the nanocomposite material and, where appropriate, in addition to the conductive agent, to form the ink;
  step D) includes a step of drying;

the method includes, after step E), a step F) of drying to eliminate all traces of solvent on the electrode.

The invention also provides an electrode comprising an electricity collector and a core-shell nanocomposite material of which the core is made of silicon and the shell of carbon, characterized in that the nanocomposite material forms an active material of the electrode comprising a carbon fraction of at least 45% in this active material and in which the carbon is distributed homogeneously around the silicon.

The electrode according to the invention may also include the following features, taken alone or in combination:
- the carbon mass fraction in the active material is between 45% and 90%, preferably between 60% and 80%;
- the active material includes silicon carbide at trace levels or is devoid of silicon carbide;
- the active material includes a silicon oxide at trace levels or is devoid of such an oxide;
- the active material comprises only core-shell nanoparticles of which the core is made of silicon and the shell of carbon;
- the electrode includes, apart from an electricity collector:
  - the active material of which the mass fraction in the electrode is between 50% and 96%;
  - an electrically conductive agent of which the mass fraction in the electrode is between 0 and 25%; and
  - a polymer binder of which the mass fraction in the electrode is between 0 and 25%.
- the electrode has an energy density of at least 600 mAh/g of silicon and, preferably, more than 1000 mAh/g of silicon.

BRIEF DESCRIPTION OF THE DRAWINGS

FIG. 1a-d are representations of configurations of core-shell nanoparticles.

Other features, objects and advantages of the invention will be set out in the detailed description below made with reference to the following figures:

DETAILED DESCRIPTION

The invention is notably aimed at synthesizing, by pyrolysis, a core-shell nanocomposite material of which the core is made of silicon and the shell of carbon.

For this purpose, the following steps are implemented:
a) injecting a core precursor into a first chamber of a reactor;
b) pyrolysing the core precursor in order to form the nanoparticle core;
c) transporting the nanoparticle core thus formed in step (b) into a second chamber of the reactor communicating with the first chamber;
d) injecting a shell precursor into the second chamber of the reactor;
e) pyrolysing the shell precursor in order to form the nanoparticle shell and ensure the deposition of this shell around the core;
f) collecting the nanoparticles thus formed for recovering said nanocomposite material.

Figure 2:
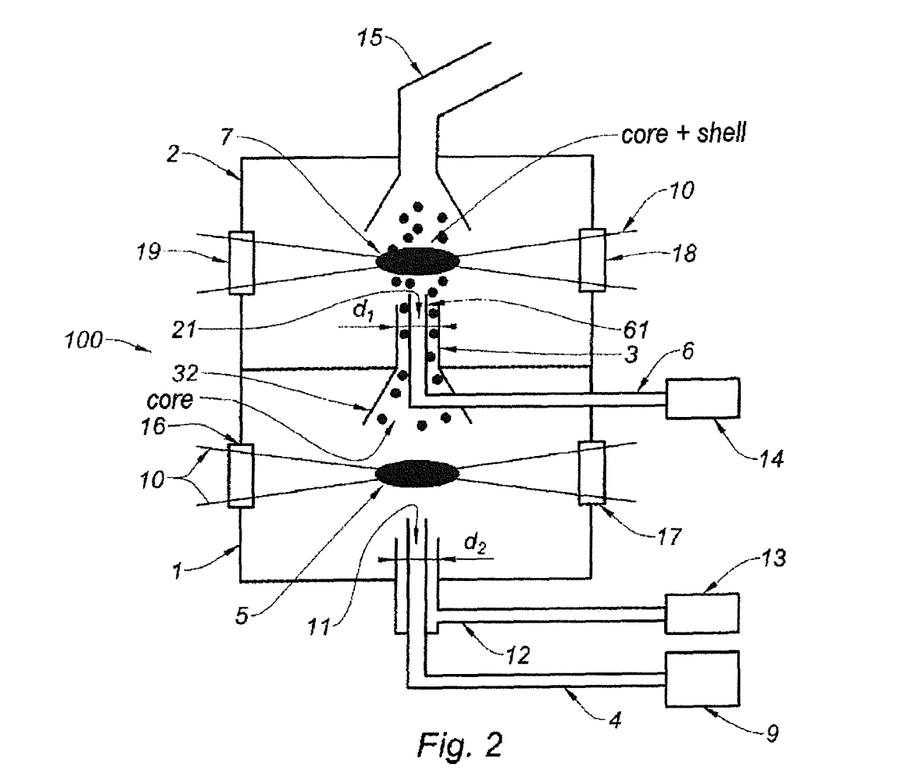
FIG. 2 is a diagram representing a reactor of the device according to the invention.

A reactor capable of being used is shown schematically in FIG. 2.

This reactor 100 includes a first chamber 1, a second chamber 2 and a communicating channel 3 between the two chambers 1, 2. In this case, the reactor 100 is arranged vertically so that the second chamber 2 is located above the first chamber 1.

The first chamber 1 is provided with an inlet 11 for a core precursor, in this case a silicon precursor. The second chamber 2 is also provided with an inlet 21 for a shell precursor, in this case a carbon precursor. Accordingly, the first chamber 1 is dedicated to the synthesis of the core and the second chamber 2 to the synthesis of the shell and the final formation of the core-shell nanoparticles.

Once the core-shell nanoparticles are formed, they are extracted from the reactor 100 through a channel 15 for recovering these nanoparticles, comprising one or more manifolds with filtering barriers. This or these manifold(s) can be used to recover the nanocomposite material.

The synthesis of the core and the shell is thus performed successively in time and in space. However, the production of the nanoparticles is performed continuously by feeding each inlet 11, 21 in continuous flow with a dedicated precursor, to the synthesis of the core or to the synthesis of the shell, as the case may be.

This synthesis offers many advantages over existing techniques, e.g. those described in documents D1 or D2.

The continuous synthesis of nanocomposite material is particularly useful since it greatly simplifies obtaining this material.

In addition, this synthesis limits the formation of oxides or chemical compounds other than Si—C nanoparticles owing to the reduced exposure time of the silicon core with its environment in the first chamber and during its passage between the two chambers of the reactor (continuous production).

Furthermore, this synthesis limits the possible formation of silicon carbide (SiC) in the second chamber 2 of the reactor, notably owing to the successive formation of the silicon core, then the carbon shell.

The inlets 11, 21 will generally be in the form of injection nozzles.

The inlet 11 of the first chamber 1 is connected to an intake channel 4 for the core precursor, this channel 4 being connected to a source 9 for the core precursor.

An inert gas is advantageously led into the first chamber 1 via a conduit 12, part of which surrounds the channel 4, said conduit 12 being further connected to a source 13 of this gas.

This inert gas is used mainly for the containment of the interaction zone. This prevents any contact between the precursor and the walls of the chamber, thus limiting the risks of chemical reaction with the silicon and/or carbon precursors. This inert gas also prevents any oxidation of the silicon.

Thanks to this containment, any pollution of the silicon core is further restricted, or even prevented. The silicon core thus keeps its chemical integrity, without the formation of oxides or other chemical compounds that may be generated by the techniques provided in documents D1 and D2.

This neutral gas may also help in transporting the nanoparticle core.

For this reason, step a) will advantageously be performed using an inert gas such as argon.

In parallel with the transmission of nanoparticle core toward the second chamber 2, a shell precursor is led into the second chamber 2. For this purpose, the inlet 21 of the second chamber 20 forms one end of a an intake channel 6 of this precursor, connected to a source 14 for this precursor. In this case, a portion 61 of this intake channel is accommodated inside the communicating channel 3 between the two chambers 1, 2.

The nanoparticle core and the shell precursor are thus mixed in the second chamber 2.

The precursor is fed into each chamber 1, 2 separately. In practice, this can be used to control the quantity of precursors introduced into each chamber 1, 2 and therefore the mass fraction of carbon/silicon in the nanocomposite material finally obtained. In addition, control of the flow rates in each precursor intake channel can be used to control the homogeneity of the mixture in the second chamber 2. As will be explained in the rest of the description, this has consequences for the electrochemical properties of an electrode capable of being produced with this nanocomposite material.

A precursor capable of being used for silicon is silane, which is in gaseous form. A precursor capable of being used for carbon is ethylene.

Pyrolysis of the precursors is advantageously, but not exclusively, performed by laser pyrolysis.

Figure 3:
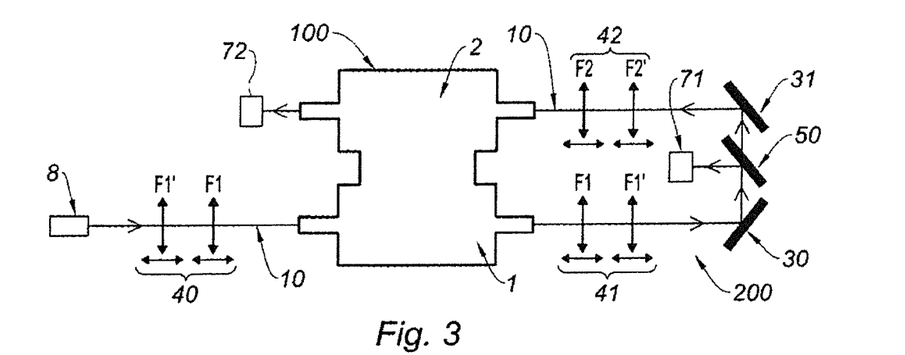
FIG. 3 represents a device according to the invention comprising an optical device used with the reactor represented in FIG. 1.
Figure 4:
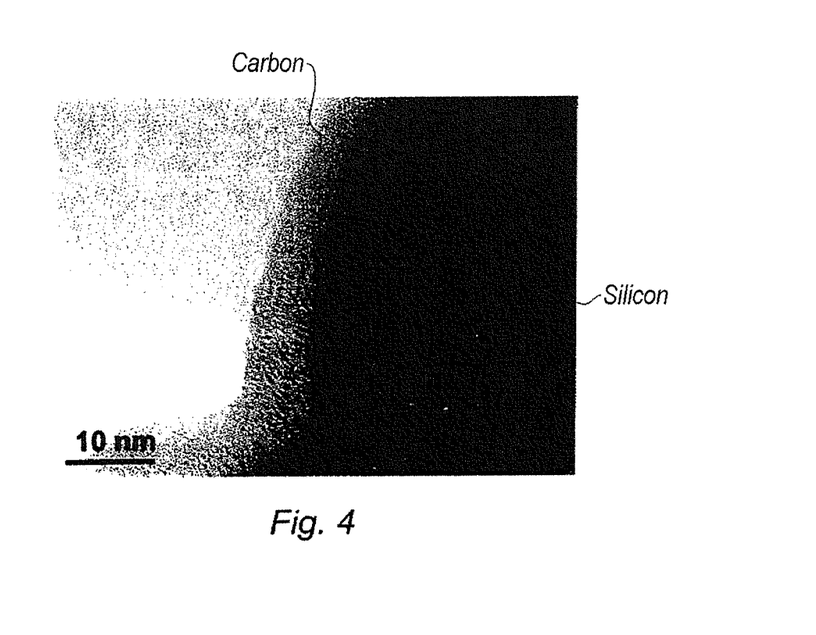
FIG. 4 represents a Si—C nanocomposite material obtained by the method according to the invention.

FIG. 3 represents an optical device 200 for implementing this laser pyrolysis on the reactor 100 shown schematically in FIG. 2.

The optical device 200 includes a laser 8 and a set of two mirrors 30, 31. The laser 8 is arranged on the side of the first chamber 1 for illuminating this first. The laser beam 10 has a propagation axis intersecting the vertical and, in this case, horizontal. The first chamber 1 thus comprises lateral walls 16, 17 transparent to the laser beam 10 to allow the laser beam to pass therethrough, along a substantially horizontal axis.

Another respective arrangement of the laser 8 could be provided relative to the reactor 100. However, this arrangement is particularly practical for ensuring that the laser beam is capable of interacting with said precursors in order to form the core and the shell.

The set of mirrors 30, 31 is used to redirect the laser beam 10 emerging from the first chamber 1 in the direction of the second chamber 2, so that the laser beam passes through the second chamber along a propagation axis intersecting the vertical and, in this case, horizontal. The second chamber 2 thus includes lateral walls 18, 19 transparent to the laser beam 10.

Advantageously, the mirrors 30, 31 are plane and associated with one or more focusing means 40, 41, 42. Thus, as represented in FIG. 3, it is possible to implement a first focusing means 40 between the laser 8 and the first chamber 1, a second focusing means 41 between the first chamber 1 and the mirror 30 (in order to recollimate the laser beam 10 emerging from the first chamber 1 before passing through the mirrors 30, 31) and finally, a third focusing means 42 between the mirror 31 and the second chamber 2.

A beam splitter 50 may be provided, notably between the two mirrors, for adjusting the power of the laser beam in the second chamber 2.

Means of stopping 71, 72 the laser beam are provided, in particular at the outlet of the second chamber 2.

Example of Embodiment

The optical device 200 employed is that of FIG. 3, without a beam splitter. Focusing means 40, 41 have been used between the laser 8 and the first chamber 1 and at the outlet of the first chamber 1. More precisely, a cylindrical lens 40 with a focal length of 500 mm has been placed between the laser 8 and the first chamber 1 and a similar lens 41 has been placed at the outlet of the first chamber 1, at 1000 mm from the lens 41. The lens 41 serves to recollimate the laser beam 10 before it passes through the mirrors 30, 31. No focusing was performed for the laser beam entering the second chamber 2.

The reactor 100 is that represented in FIG. 2. Silane is used as a (silicon) core precursor. Ethylene is used as a (carbon) shell precursor.

The following parameters are used:
silane flow rate (chamber 1)=46 sccm;
ethylene flow rate (chamber 2)=406 sccm;
laser power=560 W;
pressure in the reactor=atmospheric;
inlet 11 diameter=2 mm;
inlet 21 diameter=10 mm;
communicating channel 3 diameter ($d_1$) on the side of the second chamber=24 mm;
diameter ($d_2$) of the shaft surrounding the channel 4=20 mm.

In this way, a nanocomposite material could thus be obtained made of silicon nanoparticles of approximately 100 nm coated with a carbon shell homogeneously distributed around the silicon core, the thickness of which is approximately 5 nm to 10 nm. This corresponds to a nanocomposite material comprising a carbon mass fraction of 71%. As will be explained subsequently, this nanocomposite material may be used to form the electrode E3.

FIG. 3 is an image of this nanocomposite material, on which the silicon and its homogeneous coating of carbon can be distinguished.

It is similar to the structures represented in diagram a) of FIG. 1.

This is only one example, since it is possible, with the method previously described, to obtain Si—C nanoparticles with a homogeneous coating of carbon of which the total dimensions are between 5 nm and 1000 nm. Thus, 'individual' Si—C nanoparticles (as represented in diagram a) of FIG. 1) can be obtained for which the thickness of the carbon shell is less than 20 nm and generally of the order of 3 nm to 5 nm. Si—C nanoparticles can also be obtained for which the silicon cores are dispersed in a carbon agglomerate (as shown in diagram c) of FIG. 1), whereof the thickness of the shell may reach 200 nm.

Furthermore, the silicon core may be monocrystalline, polycrystalline or amorphous. The carbon shell may be more or less organized, i.e. more or less graphitic. This can be managed during pyrolysis. In addition, it is conceivable, with the device 100 described previously, to dope the silicon in order to improve electrical conductivity. Thus, this doping may be a P-type doping using a boron precursor such as diborane. This doping may, on the contrary, be an N-type doping using a phosphorus precursor such as phosphine.

This nanocomposite material can then be used as an anode in a lithium-ion accumulator (battery) or as a cathode in a lithium accumulator (in metal form).

For this purpose, the invention provides a method for producing an electrode comprising a core-shell nanocomposite material of which the core is made of silicon and the shell of carbon.

This method of production comprises the following steps:
A) synthesizing a core-shell nanocomposite material in accordance with the method of synthesis described previously (steps a) through f));
B) dispersing the nanocomposite material synthesized in step A) in a solvent to form an ink;
C) applying this ink onto a support;
D) eliminating the solvent from the ink applied onto the support in step C), said support being intended to form an electricity collector;
E) pressing or calendering the electrode.

Step B) may consist in dispersing an electrically conductive agent in the solvent, in addition to the nanocomposite material, to form the ink.

This conductive agent is advantageously of the divided carbon type, e.g. carbon black, carbon fibers or carbon nanotubes, or a mixture thereof.

Step B) may also consist in dispersing a polymer binder in the solvent, in addition to the nanoparticles and, where appropriate, in addition to the conductive agent.

Advantageously, the solution comprising the solvent will comprise the nanocomposite material, a conductive agent and a polymer binder.

The polymer binder may be soluble in an aqueous solvent. It may then contain a mixture of carboxymethylcellulose (CMC) polymer and a copolymer of styrene-butadiene (SBR).

The polymer binder may be soluble in an organic solvent. It may then contain polyimide.

The solvent may therefore be aqueous or organic.

The support introduced in step C) is made of an electrically conductive material, such as copper.

Step D) may include a step of drying.

Step E) of pressing or calendering is aimed at modifying the porosity of the electrode, for obtaining a porosity of between 30% and 70%.

This can be used to increase the energy density of the electrode, which depends notably, but not only, on this porosity.

Typically, energy densities of at least 600 mAh/cm$^3$ are sought in the active material and, preferably, greater than 1000 mAh/cm$^3$.

For this purpose, one metric ton/cm$^2$ of nanocomposite material may be pressed. The calendering consists in its turn in passing the electrode between two rollers spaced a determined distance apart according to the property sought. Generally, the distance separating the two rollers is a few tens of microns.

Finally, after step E), a step F) of drying may be performed to eliminate all traces of solvent on the electrode.

In this case, the electrode will comprise the electrically conductive support, also called a collector and, on the surface of this support, the active material of the electrode (Si—C nanocomposite material) with optionally the conductive agent and/or the polymeric binder.

More specifically, the electrode will include (without support/electricity collector):
the active material of which the mass fraction in the electrode is between 50% and 96%, e.g. between 70% and 96%;
an electrically conductive agent of which the mass fraction in the electrode is between 0 and 25%, e.g. between 0 and 10%;
a polymer binder of which the mass fraction in the electrode is between 0 and 25%, e.g. between 4% and 15%;
the cumulative mass fraction of the active material, the electrically conductive agent and the polymer binder making 100% insofar as the mass of the support/electricity collector is not integrated.

Example of Embodiment of an Electrode for a Lithium Accumulator

A lithium accumulator 100' has been fitted with this electrode for identifying the electrochemical features thereof.

Figure 5:
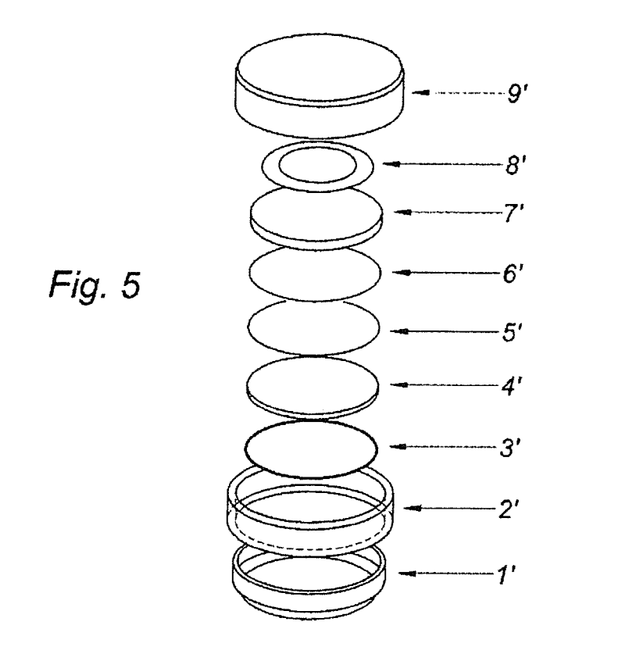
FIG. 5 represents, in an exploded view, an experimental setup of a lithium accumulator comprising an anode obtained by a method according to the invention.

A schematic exploded view of this accumulator 100' is represented in FIG. 5.

The accumulator 100' includes a lower cover 1', a seal 2', a spacer 3', an electrode 4', a separator 5', lithium in metal form 6', another spacer 7', a spring 8' and an upper cover 9'.

The covers 1', 9' and the seal are used to form a tightly sealed housing for the electrolyte, in this instance a salt of $LiPF_6$ at a concentration of 1 mole dissolved in a mixture of ethylene carbonate/diethylene carbonate in a proportion of 1:1.

The separator 5' is polyethylene(PE)- and polypropylene (PP)-based and has a thickness of a few microns.

When the accumulator 100' includes a Si—C electrode 4' facing the lithium 6' in metal form, the oxidation-reduction potential of the silicon lithiation reaction is greater than the deposition potential of the lithium in metal form. In this case, the electrode is positive (cathode).

In the diagram in FIG. 5, lithium in metal form is used so that the electrode is a cathode. A charge of the electrode 6' of the accumulator 100' then corresponds to a silicon delithiation and a discharge to a silicon lithiation.

The following conditions are applied to the accumulator 100':
cycling (charge/discharge) is performed in galvanostatic mode at a rate of C/10 (charge or discharge in 10 hours to reach the theoretical capacity of silicon, this capacity being determined according to the mass of silicon present and the theoretical mass capacity of silicon which is 3 580 mAh/g) at ambient temperature;
the discharge capacity is locked at 1 000 mAh/g of silicon or the potential at 10 mV (a potential less than 10 mV corresponds to a deposition of lithium 6' in metal form on the silicon);
the charge capacity is measured by limiting the potential to 1.2 V.

It should be noted that the cycling rate (in this case C/10) can be used to determine the current suitable for the accumulator per unit of mass of silicon (in this case 1 000 mAh/g).

Of course, the total mass of silicon must be previously known. The mass of silicon applied onto the support/electricity collector during step C) no longer changes in the rest of the method of production. It can therefore be determined at the conclusion of this step C). In practice, it is easier to determine this mass of silicon at the conclusion of step D).

The method of production according to steps A) through (E) previously described, with a pressure of 1 metric ton/cm$^2$ for step E) has been implemented for producing a plurality of electrodes all comprising 50% by mass of the Si—C nanocomposite material, 12.5% by mass of carbon fibers (conductive agent), 12.5% by mass of carbon black (conductive agent) and 25% by mass of carboxymethylcellulose (polymer binder).

However, these different electrodes are distinguished from each other by the carbon mass fraction within the Si—C nanocomposite material (the mass fraction of the nanocomposite material in the electrode remaining at 50%).

In general, the effect of the carbon mass fraction in the active material, e.g. on the stability of the electrode/electrolyte interface, is known.

However, the influence of the carbon shell is a priori modified by the production method according to steps A) through E) and in particular by step A) since, in comparison with existing techniques, it can be used to define a nanocomposite material made of Si—C (active material for the electrode) in which the carbon shell is more uniformly distributed around the core.

The electrochemical properties of the nanocomposite material, as the electrode active material are therefore a priori modified. This is especially true when a neutral gas stream is used in step A), for preventing oxidation of the silicon.

For this reason, the inventors have tested the following electrodes.

An electrode E1, that comprised 35% by mass of carbon in the nanocomposite material.

An electrode E2, that comprised 62% by mass of carbon in the nanocomposite material.

An electrode E3, that comprised 71% by mass of carbon in the nanocomposite material.

Finally, an electrode E4, that comprised 75% by mass of carbon in the nanocomposite material.

Furthermore, with a view to acting as a reference, one electrode E0 comprised only silicon in the 'nanocomposite' material (carbon mass fraction=0%). Silicon can be produced with the device in FIG. 2, without injecting a precursor into the second chamber or with a known laser pyrolysis device comprising only a single chamber.

For varying the level of carbon in the nanocomposite material, the quantity of core and shell precursors is adjusted in the device 100. For example, for the electrode E3, and as described previously, 46 sccm of silane and 106 sccm of ethylene are used.

Each electrode E2 through E5 thus produced has an energy density of at least 600 mAh/cm$^3$ and, preferably, greater than 1 000 mAh/cm$^3$.

Figure 6:
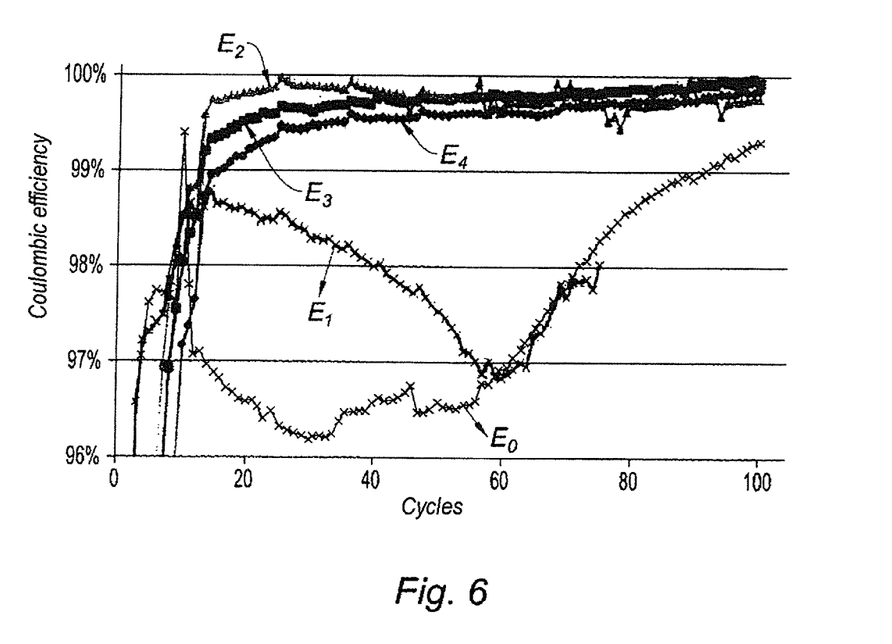
FIG. 6 represents, for different electrodes comprising a nanocomposite material obtained according to a method in accordance with the invention, the variation in coulombic efficiency as a function of the cycle number, these variations being determined from the experimental setup in FIG. 5.

FIG. 6 represents, for each accumulator tested with the different electrodes E0 through E4, the variation in coulombic efficiency (ordinate) as a function of the cycle number (abscissa).

A cycle is defined by one charge and one discharge of the electrode concerned.

Coulombic efficiency is defined here as the ratio between the delithiated silicon capacity over the lithiated silicon capacity, that is, the proportion of reversibly lithiated lithium within the silicon. This coulombic efficiency may be determined at each cycle.

It should be noted that the coulombic efficiency in the first cycles is low, which may be compensated by an additional lithium source.

As can be seen in FIG. 6, after a few cycles, a coulombic efficiency greater than 99%, or even 99.5%, is obtained with the electrodes E2 (62% by mass of carbon in the nanocomposite material), E3 (71% by mass of carbon in the nanocomposite material) and E4 (75% by mass of carbon in the nanocomposite material).

Moreover, the variation in coulombic efficiency is stable, from the 20$^{th}$ cycle, for these same electrodes E2, E3 and E4. This is reflected in good stability of the electrode/electrolyte interface.

Contrariwise, the electrodes E0 (no carbon in the 'nanocomposite' material) and E1 (35% by mass in the nanocomposite material) display unstable coulombic efficiencies. This is reflected in great instability of the interface between this electrode and the electrolyte.

These coulombic efficiencies are, moreover, lower than those obtained with the electrodes E2 through E4.

These various tests thus demonstrate that to obtain an electrode which, in practice, is capable of functioning properly, it is preferable to provide a carbon mass fraction greater than or equal to 45% within the Si—C (active material) nanocomposite material. Step A) is therefore performed accordingly, by selecting the respective proportions of the core and shell precursors.

Advantageously, the carbon mass fraction within the Si—C material will therefore be between 45% and 90%, preferably between 50% and 90%, between 50% and 85% or even more preferably between 55% and 85%, or even between 60% and 80%.

The results that have been described are transposable to an anode for a lithium-ion accumulator. However, a charge of the anode would then correspond to a silicon lithiation and a discharge to a silicon delithiation.

In order to better identify the effect of obtaining a homogeneous coating of the carbon around the silicon, a comparison may be made with document D2.

Figure 7:
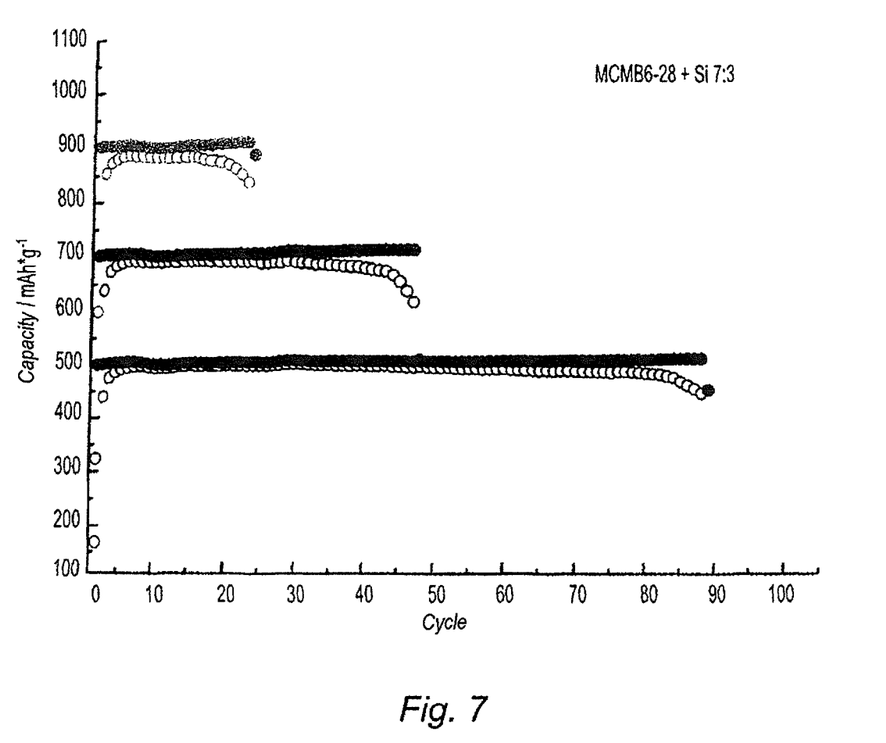
FIG. 7 represents the variation in charge/discharge capacities of an electrode for a lithium-ion accumulator according to the prior art as a function of a charge/discharge cycle number, for different limit values of the discharge capacity.

The attached FIG. 7 reproduces FIG. 4 of document D2. Since the document relates to an anode for a lithium-ion accumulator, FIG. 7 represents the variation in the lithiated silicon capacity (anode charge=Li+extraction capacity) and the delithiated silicon capacity (anode discharge=Li+insertion capacity) as a function of cycle number, for discharge capacities limited, respectively, to 500 mAh/g, 700 mAh/g and 900 mAh/g.

Coulombic efficiency is defined here as the ratio between the lithiated silicon capacity over the delithiated silicon capacity, which still corresponds to the proportion of reversibly lithiated lithium within the silicon.

For the electrodes E1 through E4 tested in the context of the invention, it is recalled that the discharge capacity was locked at 1 000 mAh/g of silicon, which is close to the test carried out at 900 mAh/g in document D2.

Furthermore, the electrode E3 tested in the context of the invention has a carbon mass fraction of 71%, or 29% for silicon. This is very close to the composite material MCMB 6-28+Si 7:3 (i.e. a silicon mass fraction of 30% in the composite material) on which the tests in FIG. 7 were performed (MCMB 6-28 is a synthetic graphitic material provided by the Osaka Gas company, Japan; see document D2).

A comparison can therefore be made between the results of FIG. 7 (with a discharge capacity of 900 mAh/g) and those of FIG. 6 for the electrode E3.

In making this comparison, it should be noted that the electrode E3 has a much higher stability. Indeed, stability is ensured beyond 100 cycles while in FIG. 7, the electrode becomes unstable from the 15$^{th}$ cycle. In addition, the results of FIG. 7 suggest that the coulombic efficiency does not exceed 98%.

Finally, the invention reveals that the combination of a carbon mass fraction greater than or equal to 45% in the nanocomposite material with a homogeneous distribution of carbon around the silicon enables an electrode to be obtained of which the stability and coulombic efficiency are excellent.

Thus, the invention also relates to an electrode comprising an electricity collector and a core-shell nanocomposite material of which the core is made of silicon and the shell of carbon, characterized in that the nanocomposite material forms an active material of the electrode comprising a carbon fraction of at least 45% in this active material and in which the carbon is distributed homogeneously around the silicon.

Advantageously, the carbon fraction in the active material is between 45% and 90%, preferably between 60% and 80%.

The invention claimed is:

1. A method for producing an electrode comprising a core-shell nanocomposite material of which the core is made of silicon and the shell of carbon, characterized in that it includes the following steps:
   A) synthesizing the nanocomposite material in accordance with the following substeps:
      a) injecting a silicon core precursor into a first chamber of a reactor;
      b) pyrolysing the silicon core precursor in order to form the nanoparticle core;
      c) transporting the nanoparticle core thus formed in step (b) into a second chamber of the reactor communicating with the first chamber;
      d) injecting a carbon shell precursor into the second chamber of the reactor;
      e) pyrolysing the shell precursor in order to form the nanoparticle shell and ensure the homogeneous deposition of this shell around the core;
      f) collecting the nanoparticles thus formed so as to obtain the nanocomposite material;
   in which the quantities of silicon and carbon precursor are injected in a proportion such that the carbon mass fraction in the nanocomposite material is greater than or equal to 45%;
   B) dispersing the nanocomposite material synthesized in step A) in a solvent to form an ink;
   C) applying this ink onto a support intended to form an electricity collector;
   D) eliminating the solvent from the ink applied onto the support in step C) to obtain the electrode;
   E) pressing or calendering the electrode.

2. The method as claimed in claim 1, wherein step a) is performed using an inert gas.

3. The method as claimed in claim 1, wherein step b) and/or step e) is/are performed by laser pyrolysis.

4. The method as claimed in claim 1, wherein the quantities of silicon and carbon precursor are injected in a proportion such that the carbon mass fraction in the nanocomposite material is between 45% and 90%.

5. The method as claimed in claim 1, wherein step B) consists of dispersing an electrically conductive agent in the solvent, in addition to the nanocomposite material, to form the ink.

6. The method as claimed in claim 5, wherein said electrically conductive agent is carbon black, carbon fibers or carbon nanotubes, or a mixture thereof.

7. The method as claimed in claim 1, wherein step B) consists of dispersing a polymer binder in the solvent, in addition to the nanocomposite material and, in addition to an electrically conductive agent, where such an electrically conductive agent is present.

8. The method as claimed in claim 1, wherein step D) includes a step of drying.

9. The method as claimed in claim 1 wherein the quantities of silicon and carbon precursor are injected in a proportion such that the carbon mass fraction in the nanocomposite material is between 60% and 80%.

10. The method as claimed in claim 5, wherein the conductive agent comprises carbon black, carbon fibers or carbon nanotubes, or a mixture thereof.

* * * * *